(12) United States Patent
Endo et al.

(10) Patent No.: US 6,216,188 B1
(45) Date of Patent: Apr. 10, 2001

(54) COMPUTER SYSTEM HAVING COMPUTER PROVIDED WITH UNIVERSAL-SERIAL-BUS AND DEVICE CONFORMING TO UNIVERSAL-SERIAL-BUS STANDARD

(75) Inventors: Yoshihisa Endo; Kazuhito Ooshita; Shinichi Higuchi; Yuko Sonoda; Kouichi Ogino, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/215,867

(22) Filed: Dec. 18, 1998

(30) Foreign Application Priority Data

Jan. 12, 1998 (JP) .................................................. 10-003617

(51) Int. Cl.$^7$ ....................................................... G06F 13/00
(52) U.S. Cl. ............................ 710/103; 710/102; 710/63; 709/301
(58) Field of Search ..................................... 710/102, 103, 710/100, 101, 126, 2, 62, 63, 8, 104; 713/1, 100; 709/301; 717/11

(56) References Cited

U.S. PATENT DOCUMENTS

| | | |
|---|---|---|
| 4,589,063 | 5/1986 | Shah et al. . |
| 4,974,151 | 11/1990 | Advani et al. . |
| 5,655,148 | 8/1997 | Richman et al. . |
| 5,761,448 | 6/1998 | Adamson et al. . |
| 5,815,731 | 9/1998 | Doyle et al. . |
| 5,819,107 | 10/1998 | Lichtman et al. . |
| 6,003,097 | 12/1999 | Richman et al. . |
| 6,009,480 | 12/1999 | Pleso . |

*Primary Examiner*—Gopal C. Ray
(74) *Attorney, Agent, or Firm*—Brinks Hofer Gilson & Lione

(57) ABSTRACT

With a control section implemented by software, which is provided for a personal computer, when a device is added, a device driver dedicated to the device starts running. When a device is removed, the corresponding device driver is released. Since a control apparatus is used which includes the personal computer provided with the control section, a wireless device, and a universal serial bus (USB) controller for transferring data to and from the device, the device can be used immediately after it is disposed at a predetermined location.

3 Claims, 3 Drawing Sheets

COMPUTER SYSTEM HAVING COMPUTER PROVIDED WITH UNIVERSAL-SERIAL-BUS AND DEVICE CONFORMING TO UNIVERSAL-SERIAL-BUS STANDARD

BACKGROUND OF THE INVENTION

1. Field of the Invention

The present invention relates to device control methods and device control apparatuses for connecting a device conforming to the universal serial bus (USB) standard to a computer, and more particularly, to a device control method and a device control apparatus which simplify a procedure required for connection to the device.

2. Description of the Related Art

A new standard for personal computers, called a universal serial bus (USB), has been recently formed and units conforming to this standard have been made commercially available. In this new standard, each of various types of peripheral units (hereinafter called devices), such as a keyboard, a mouse, and a game controller, has a connector with the same shape, and is connected to a USB port of a computer by the use of this connector.

The USB port has four pins in its inside and the pins are used for D+ and D– data lines, a power line, and the ground. Either the D+ pin or the D– pin is used to indicate that the device is connected or not connected. Whichever pin is used is pulled up (switched on) to indicate that a device is being connected, or the pin is pulled down (switched off) to indicate that a device is not connected.

Usually, one computer is provided with two USB ports of the same type. If three or more devices conforming to the USB standard are to be connected, then one or more ports may be lacking.

To handle such a case, a unit called a USB hub 9 shown in FIG. 3 has been developed, which is provided with a plurality of ports 2b having the same shape as a USB port 2a formed in a personal computer. When the USB hub 9 is connected to the USB port 2a of the personal computer, a plurality of devices can be connected to the USB port 2a of the personal computer.

The USB hub 9 shown in FIG. 3 is connected to the personal computer (PC) 2 by the use of a USB interface cable 6. A device 1, a device 2, and a device X are connected to USB ports 2b formed in the USB hub 9 with USB interface cables 7.

However, device connection with the use of a usual USB port or device connection with the use of the USB hub 9, described above, has the following inconveniences.

When a new device (device X in this case) is added to the PC 2 after devices (device 1 and device 2 in this case) have already been connected, the PC 2 does not identify the new device X and a driver for the device X does not run unless a USB connector formed at a end of the interface cable 6 is disconnected from the USB port 2a of the PC 2 then and connected again. When a connected device is removed, a device driver for the device cannot be deleted without disconnecting the USB connector and connecting it again in the same way as above.

If a USB port is formed at the back of a personal computer, it is very troublesome to disconnect a USB connector and connect it again at the back of the personal computer.

As described above, when a device is added or is removed, the D+ pin (or the D– pin) of the USB port, which has been pulled up, is pulled down and then pulled up again to send the information of each device being connected at the time before the pin is pulled down, to the personal computer through data lines 6a and 6b. In this way, the personal computer can reidentify device connections.

Without disconnecting the USB connector and connecting it again, device connections can be identified again by resetting the personal computer. In this case, it takes a long time to make the personal computer ready and the operation therefor is troublesome. In addition, if the personal computer is reset, any application programs being currently used have to be ended.

The USB hub 9 described above just allows an increase in the number of devices to be connected. When a device is added or removed, the USB connector needs to be disconnected and connected again at the USB port 2a, or the personal computer has to be reset, in the same way as in a case in which the USB hub 9 is not used.

A wireless device is easier to handle because it does not have a cable. Even for such a device, a connector needs to be disconnected and connected again, or an operation corresponding thereto is required to identify device connection again. A further operability improvement cannot be expected, which uses the advantages of a wireless device.

SUMMARY OF THE INVENTION

Accordingly, it is an object of the present invention to provide a device control method and a device control apparatus which automatically identify device connection and allow a connected device to be used, without initializing the device by resetting a system or by disconnecting a connector and then connecting it again.

The foregoing object is achieved in one aspect of the present invention through the provision of a device control method in which a device driver is switched when a computer provided with a USB port is connected to a device which conforms to the USB standard and is used by being connected to the computer, wherein a control section which can switch the device driver is provided for the computer, and when a new device is added to the computer or a connected device is removed from the computer, the control section allows the device driver to be automatically switched to a driver dedicated to the device without switching a data-line connection pin provided for the USB port or without performing the corresponding switching operation.

With the foregoing means, the computer perceives that a device has been connected and can immediately make the connected device ready just by connecting the device to the computer, without disconnecting a connector from the USB port and then connecting it again after the device is added or removed or without resetting the system.

In this case, the control section can be introduced into the computer by software.

By installing the software into the computer in advance, when a new device is connected, a device driver dedicated to the device immediately starts running and is readily used.

Even an unfamiliar device (a device whose device driver is not installed in advance) can be used by upgrading the software to a version which handles the unfamiliar device. If the operating system of the computer is updated to a new version, the program only needs to be changed so that the software corresponds to the operating system. The user does not need to buy new hardware.

It is preferred that the device be a wireless device connected to the computer through a controller which transmits and receives device data.

As described above, when a wireless device is used, the device is made ready just by disposing it at a predetermined location specified by the controller. By moving the device from the predetermined location, the device driver which corresponds to the device and which has started running in the computer is released.

In this case, when a new device is disposed at a predetermined location, the controller receives information from the device and sends the received device information to the computer. The control section perceives the device information, identifies the type of the connected device, and activates a device driver dedicated to the device.

The foregoing object is achieved in another aspect of the present invention through the provision of a device control apparatus including a computer provided with a USB port, a device which conforms to the USB standard and is used by being connected to the computer, and a control section which can switch the driver of the device, wherein the control section is introduced into the computer by software. Thereby, when a new device is added to the computer or a connected device is removed from the computer, the device driver is automatically switched to a driver dedicated to the device without switching a data-line connection pin provided for the USB port or without performing the corresponding switching operation.

Since the control section provided for the computer is implemented by the software in the control apparatus, a device is made ready just by disposing it at a predetermined location without adding new hardware.

As described above, according to the present invention, when a new device is connected, the device can be used immediately after the connection without switching either the D+ pin or the D– pin provided for the USB port of the personal computer, or without resetting the system. Since software can handle the processing, even if a not-installed driver is to be used or the operating system is updated, the processing is accomplished by only changing the program, thereby providing improved cost-effectiveness.

DESCRIPTION OF THE PREFERRED EMBODIMENT

Figure 1:
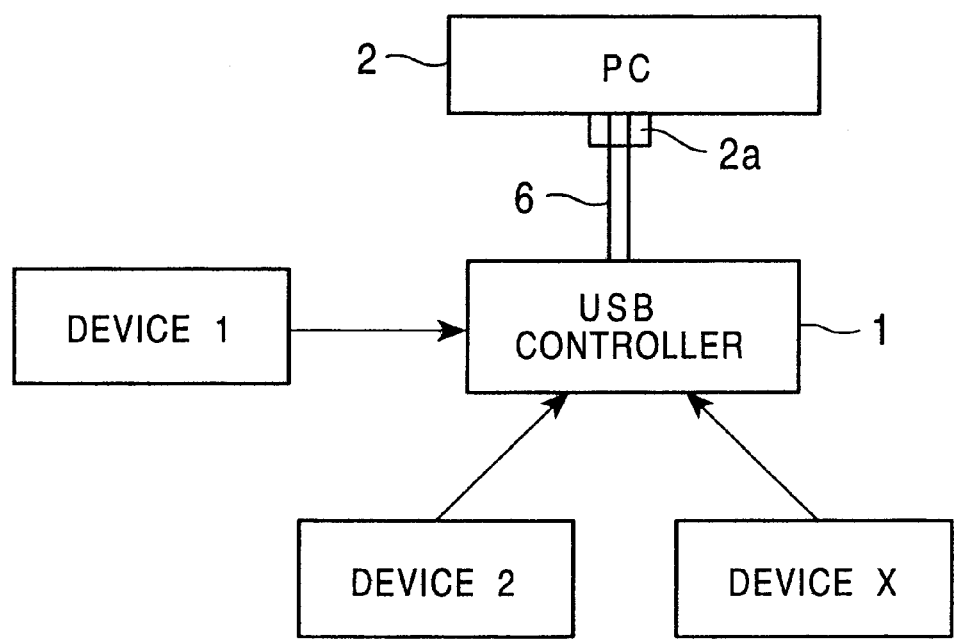
FIG. 1 is an outlined view of connections between a personal computer and devices.

A device control method and a device control apparatus according to the present invention will be described below by referring to the drawings.

FIG. 1 is an outlined view of connections between a personal computer (PC 2), a USB controller 1, and various types of devices. The devices are of a wireless type. Not all of them need to be wireless.

The PC 2 is connected to the USB controller 1 with a USB interface cable 6 through a USB port 2a. A plurality of wireless devices are connected to the USB controller 1.

The USB port 2a has four pins in its inside. The pines are used for D+ and D– data lines, a power line, and the ground. Either the D+ pin or the D– pin is pulled up when a connector is inserted to the port, and thereby the PC 2 perceives that a device has been connected. When a connector is not inserted into the port, either the D+ pin or the D– pin is pulled down (switched off) to the ground, and thereby the PC 2 perceives that a device is not connected. In the USB standard, transmission rates of 1.5 MB/bps and 12 MB/bps are supported and either transmission rate is applied according to the type of a connected device.

The USB controller 1 can manage various types of devices in a centralized manner. For example, as shown in FIG. 1, three wireless devices (i.e., device 1, device 2 and device X) are disposed.

The USB controller 1 is provided with receiving sections for various types of devices. When a device is connected, the USB controller 1 identifies the type of the device and sends the data of the device to the PC 2. When the USB controller 1 perceives for some reason such as battery run-down that the device is not connected, the USB controller 1 sends data to the PC 2 for removing the device.

When the data of the device is sent to the PC 2 as described above, a device driver built into the PC 2 in advance starts running. When a keyboard is connected, the type of a pressed key is sent, or when a mouse is connected, the coordinate data of the cursor is sent, and the PC 2 performs predetermined processing.

Figure 2:
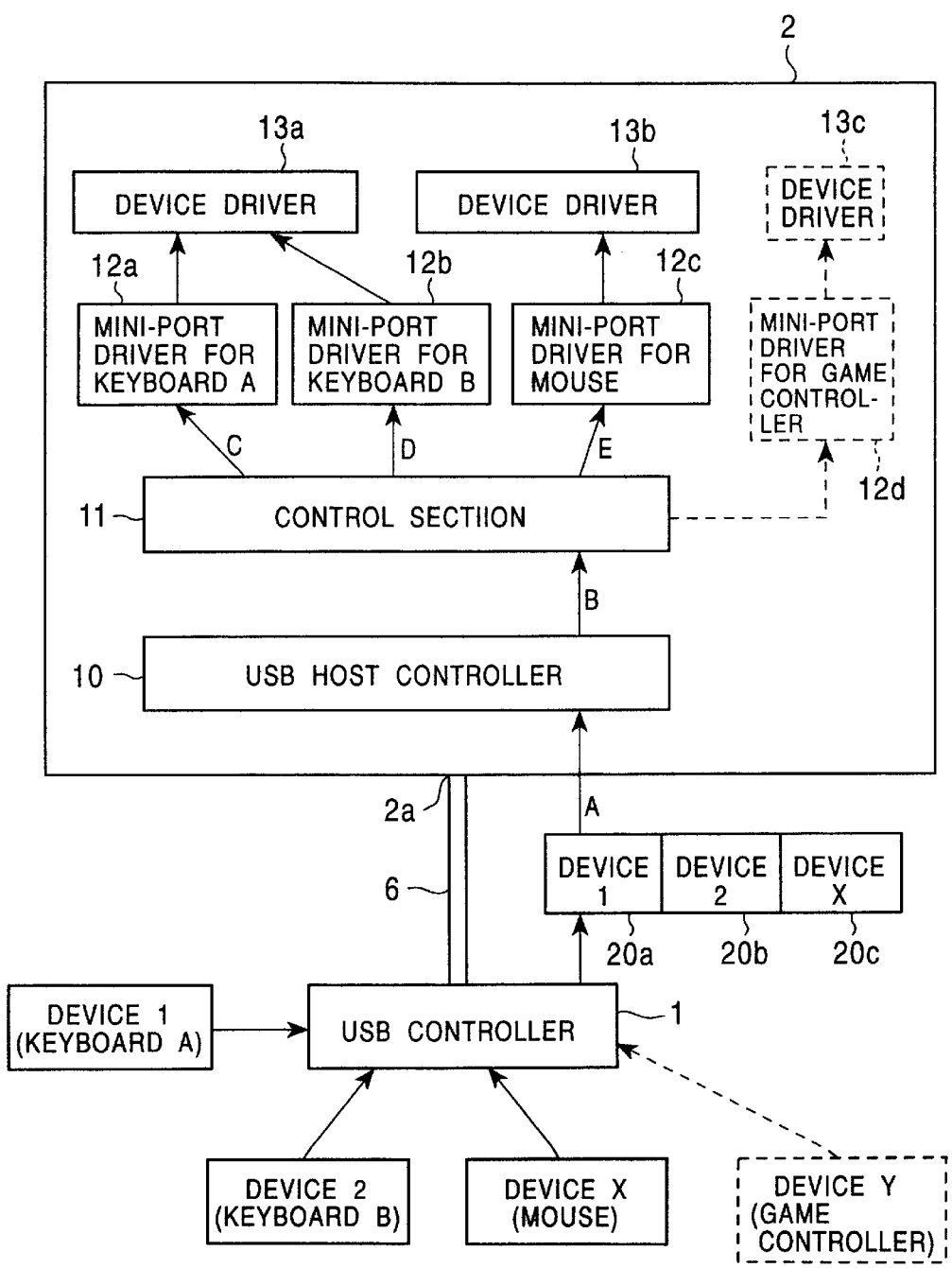
FIG. 2 is a block diagram showing device-data flows.
Figure 3:
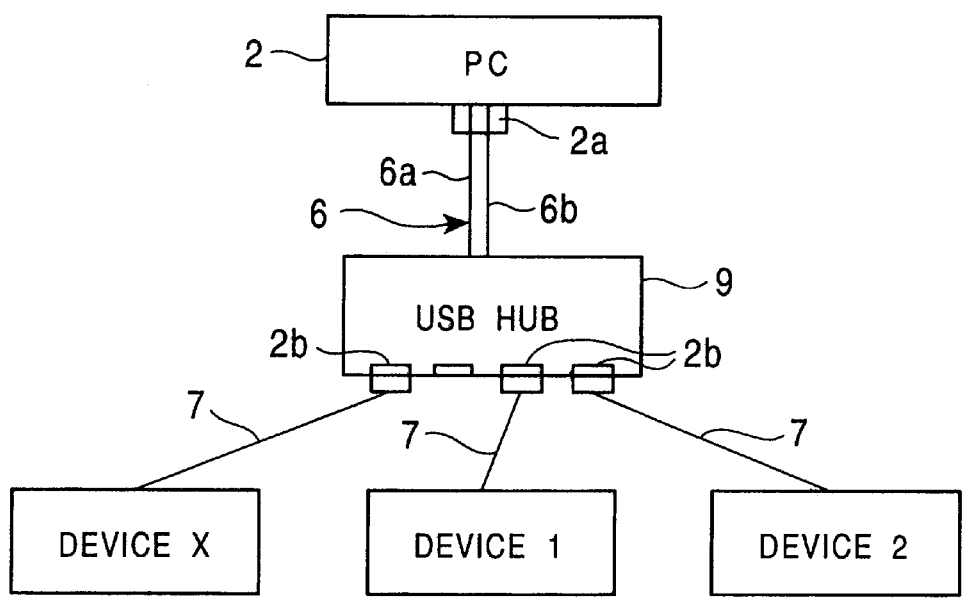
FIG. 3 is an outlined view of conventional connections between a personal computer and devices.

FIG. 2 is a block diagram used for describing data flows of devices and those inside the PC 2.

The PC 2 is provided with a USB host controller 10, a control section 11, mini-port drivers 12a, 12b, and 12c dedicated to devices, and processing sections 13a and 13b for processing data from each device.

The USB host controller 10 receives device data sent from the USB controller 1 in a centralized manner and sends it to the control section 11. The control section 11 transmits the received device data to the corresponding drivers dedicated to devices.

As shown in FIG. 2, it is assumed that the three types of wireless devices, the device 1, the device 2, and the device X, are a keyboard A, a keyboard B, and a mouse, respectively, and a case in which these devices are installed will be described below.

When each device is installed in a predetermined area (an area in which it can be detected) of the USB controller 1, the USB controller 1 gives identification information indicating the type of each device and sends device information through a USB interface cable 6 as data 20a, data 20b, and data 20c. The information is not transmitted one by one but transmitted (A) by a bulk transmission method so that a plurality of data items are sent as a group.

When the USB interface cable 6 is connected to the USB port 2a, either the D+ pin or the D– pin in the port 2a is pulled up (switched on) and a transmission rate of 1.5 MB/bps or 12 MB/bps is determined. In the USB interface cable 6, data is transferred through the two D+ and D– data lines.

The USB host controller 10 transmits (B) the data 20a, the data 20b, the data 20c sent from the devices to the control section 11. The control section 11 activates the mini-port drivers 12a, 12b, and 12c according to the identification information in the device data 20a, 20b, and 20c, and sends the device data through the mini-port drivers 12a, 12b, and 12c. In this case, the control section 11 automatically divides (C, D, E) the data such that the data 20a, 20b, and 20c are sent to the drivers of the keyboard A (12a), the keyboard B (12b), and the mouse (12c), respectively.

The mini-port drivers 12a and 12b for the keyboards A and B send an input signal from the keyboards to an integrated device driver 13a which converts the signal to data to be processed by the CPU. In this case, the two keyboards A and B can be connected together and used at the same time. The mini-port driver 12c for the mouse sends an input signal from the mouse indicating click information or coordinate information to a device driver 13b which converts the signal to data to be processed by the CPU.

When a new wireless device, for example, a game controller (device Y), is connected, the USB controller 1 identifies the device data of the game controller and determines identification information. The identification information and other data are sent through the interface cable 6 to the USB host controller 10 and then to the control section 11. A mini-port driver 12d dedicated to the game controller starts running and data information for the game controller is sent to a device driver 13c.

The control section 11 periodically sends a confirmation signal to the USB controller 1. According to the confirmation signal, the USB controller 1 always identifies the devices being used. If the device 1 is removed, for example, the USB controller 1 sends information indicating that the device 1 has been removed to the control section 11 and the control section 11 identifies the condition.

When a device whose device driver is not installed in the PC 2 is used, the device driver is installed into the PC 2 first, and then the control section 11 is updated by upgrading the software.

The CPU applies predetermined processing through the device driver 13a to the input data sent from the keyboards A and B as described above, and input characters and other data are displayed on a display unit of the PC. The CPU also applies predetermined processing through the device driver 13b to the input data sent from the mouse, and the cursor is moved or selection or determination is performed on a screen on the display unit of the PC.

The USB controller 1 may be disposed at any place within an area where it can detect a device, such as on a display unit, when the USB controller 1 is connected to a desktop personal computer and used.

The USB controller 1 may be provided with a USB port so that not only a wireless device but also a cable-connection-type device can be connected thereto. Instead of the USB controller 1, a USB hub may be connected so that all devices are connected with cables and used. Also in this case, a device can be simply added or removed just by disconnecting the connector and connecting it again.

What is claimed is:

1. A computer system comprising:

a computer provided with a universal-serial-bus (USB) port;

various devices conforming to the USB standard; and a USB controller for connecting said various devices to said computer, wherein said USB controller is connected to the USB port of said computer, and transmits and receives data between said computer and said various devices;

said computer comprises the device drivers corresponding to a desired number of said various devices, and a control section for using the device drivers according to identification information assigned and transmitted by said USB controller, the identification information being generated when each device is connected to said USB controller; and the control section periodically transmits signals for checking whether the desired number of said various devices are used, to said USB controller to always check a device being used by said USB controller, according to the check signals, and, when the device being used is removed from said USB controller, recognizes that the device has been removed according to removal information assigned and transmitted by said USB controller.

2. A computer system according to claim 1, wherein the control section is introduced into said computer by software.

3. A computer system according to claim 1, wherein said various devices are wireless devices, and said USB controller comprises a signal receiving section for receiving signals from said various devices and a signal transmitting section for transmitting a signal sent from said computer.

* * * * *